(12) United States Patent
Li

(10) Patent No.: US 9,193,254 B2
(45) Date of Patent: Nov. 24, 2015

(54) POWER SYSTEM OF A SERIES HYBRID VEHICLE

(71) Applicant: ZHEJIANG GEELY HOLDING GROUP CO., LTD., Hangzhou (CN)

(72) Inventor: Shufu Li, Hangzhou (CN)

(73) Assignee: ZHEJIANG GEELY HOLDING GROUP, Hangzhou (CN)

( * ) Notice: Subject to any disclaimer, the term of this patent is extended or adjusted under 35 U.S.C. 154(b) by 0 days.

(21) Appl. No.: 14/626,001

(22) Filed: Feb. 19, 2015

(65) Prior Publication Data

US 2015/0158374 A1 Jun. 11, 2015

Related U.S. Application Data

(63) Continuation of application No. PCT/CN2014/084659, filed on Aug. 18, 2014.

(30) Foreign Application Priority Data

Oct. 9, 2013 (CN) .......................... 2013 1 0467918

(51) Int. Cl.
*B60L 9/00* (2006.01)
*B60L 11/00* (2006.01)
(Continued)

(52) U.S. Cl.
CPC ... *B60K 6/46* (2013.01); *B60K 6/32* (2013.01); *B60L 11/12* (2013.01); *B60W 10/02* (2013.01); *B60W 10/06* (2013.01); *B60W 10/08* (2013.01);
(Continued)

(58) Field of Classification Search
CPC ........ B60K 6/46; B60K 6/32; Y02T 10/6295; Y02T 10/6217; B60W 10/30; B60W 10/02; B60W 10/06; B60W 10/08; B60W 20/10; B60L 11/12; Y10S 903/93
See application file for complete search history.

(56) References Cited

U.S. PATENT DOCUMENTS 7,231,877 B2 * 6/2007 Kumar ............................ 105/35
2004/0211605 A1 * 10/2004 Botti ............................ 180/65.4
(Continued)

FOREIGN PATENT DOCUMENTS

| CN | 1237276 A | 12/1999 |
|---|---|---|
| CN | 97199582 | 10/2003 |

(Continued)

OTHER PUBLICATIONS

The PCT Search Report and Written Opinion mailed Nov. 13, 2014 for PCT application No. PCT/CN2014/084659, 13 pages.

*Primary Examiner* — Mary Cheung
(74) *Attorney, Agent, or Firm* — Lee & Hayes, PLLC

(57) ABSTRACT

A power system of a series hybrid vehicle, comprising a fuel source; a control system; at least two auxiliary power units, each of which auxiliary power units, under control of the control system, independently receives fuel from the fuel source, and converts chemical energy in the fuel into electrical energy and outputs the electrical energy to a common current bus; a power battery electrically connected to a common current bus to, under control of the control system, receive electrical energy from the common current bus to perform charging or perform discharging through the common current bus; and a traction motor electrically connected to the common current bus to, under control of the control system, receive electrical energy from the common current bus and convert the electrical energy into mechanical energy and transmit the mechanical energy to a power train of the vehicle so as to drive the vehicle to run.

20 Claims, 2 Drawing Sheets

(51) Int. Cl.
  *B60K 6/20* (2007.10)
  *B60K 6/46* (2007.10)
  *B60K 6/32* (2007.10)
  *B60W 10/30* (2006.01)
  *B60L 11/12* (2006.01)
  *B60W 10/02* (2006.01)
  *B60W 10/06* (2006.01)
  *B60W 10/08* (2006.01)
  *B60W 20/00* (2006.01)
(52) U.S. Cl.
  CPC ............... *B60W 10/30* (2013.01); *B60W 20/10* (2013.01); *Y02T 10/6217* (2013.01); *Y02T 10/6295* (2013.01); *Y10S 903/93* (2013.01)

(56) References Cited

U.S. PATENT DOCUMENTS

2006/0005736 A1\* 1/2006 Kumar ........................ 105/1.4
2009/0223726 A1\* 9/2009 Jeon et al. ................ 180/65.25

FOREIGN PATENT DOCUMENTS

| | | |
|---|---|---|
| CN | 103552459 | 2/2014 |
| CN | 103786549 A | 5/2014 |
| DE | 4135233 A1 | 4/1993 |
| JP | 2011173518 A | 9/2011 |
| WO | WO2006116479 A2 | 11/2006 |

\* cited by examiner

POWER SYSTEM OF A SERIES HYBRID VEHICLE

RELATED APPLICATION

This application is a continuation of PCT International Application No. PCT/CN2014/084659, filed Aug. 18, 2014, which claims foreign priority to Chinese Application No. 201310467918.2, filed on Oct. 9, 2013, both of which are incorporated herein by reference.

FIELD OF THE INVENTION

The present disclosure relates to a hybrid vehicle.

BACKGROUND OF THE INVENTION

Since the 1990's, the problems of energy crisis and environmental pollution have become increasingly serious worldwide. Petroleum accounts for over 40 percent of worldwide total energy consumption. According to the current proved reserves and consumption speed, it is estimated that the global petroleum resources might run out in the future dozens of years.

Motor vehicles are major consumers of petroleum and a major source of air pollution. Carbon dioxide in the exhaust gas of motor vehicles is one of the main factors for the global greenhouse effect, and other components of the exhaust gas are also chief urban air pollutants.

Practices during the past many years have proven that the use of novel fuel sources and novel power systems are important channels for solving vehicle energy bottleneck and exhaust gas pollution. With respect to novel fuel sources, it has been proven in practice that the use of alternative fuel is cleaner than gasoline and diesel and is a feasible solution for solving energy crisis and pollution caused by emission. With respect to novel power systems, all-electric vehicles employing a power storage battery such as a plumbic-acid storage battery, a Ni-MH storage battery or a lithium storage battery are advantageous in zero emission, low noise and high efficiency. However, due to the restriction of electrical energy storage technologies, all-electric vehicles also have drawbacks in high manufacture costs, short continuous travel mileage and long battery-charging time. Thus, all-electric vehicles cannot really meet people's needs in use and do not have enough market competitiveness at present and for quite some time to come. Hybrid vehicles are a transitional vehicle type between the conventional vehicles and the all-electric vehicles and have advantages of the two types above such as super-low emission, high efficiency and longer continuous travel mileage, and are only slightly more costly than vehicles utilizing a conventional power system.

The power system of a hybrid vehicle includes many types such as a series power system, a parallel power system and a serial-parallel power system, wherein a series hybrid power system exhibits a relatively simple designed structure and good stability and can effectively achieve allocation and synthesis of various energies and is one currently popular technology for researching and developing the power system of hybrid vehicles.

A series hybrid electric vehicle (SHEV) generally uses a power storage battery and a fuel generator set as two kinds of basic energy storage and conventional devices, wherein the fuel generator set (engine+generator) is also called an auxiliary power unit (APU). Generally only one auxiliary power unit is provided in the prior series hybrid vehicle, wherein the auxiliary power unit mainly comprises only one fuel engine (gasoline engine or diesel engine) as an engine and only one generator for converting kinetic energy outputted by the engine into electrical energy. Also, the fuel engine is not mechanically connected to a traction motor driving the vehicle to run. However, while prior series hybrid vehicles can reduce exhaust gas emission of the vehicle and achieve better fuel economy, these vehicles still use gasoline or diesel as fuel and do not address the problem of petroleum resource exhaustion. Current alternative fuels such as natural gas or methane generally have a lower energy density. However, the power system of the series hybrid vehicle generally includes three energy conversion procedures (chemical energy→mechanical energy→electrical energy→mechanical energy), and has a lower energy conversion efficiency than a parallel hybrid power system. Therefore, it is generally believed that alternative fuels with lower energy density are not adapted for use in the series hybrid vehicles.

Functions of the auxiliary power unit of the series hybrid vehicle comprise directly outputting electrical energy and driving the vehicle to run through the traction motor, outputting electrical energy to charge a high-voltage power battery, and charging a vehicle low-voltage storage battery through DC/DC. A basic working mechanism of the auxiliary power unit is such that under the action of a control system, the engine causes a generator rotor to rotate through a mechanical connection, thereby obtaining an appropriate magnetic field intensity in the generator by controlling current intensity in the coil on the generator rotor. In addition, the coil on a generator stator generates electrical energy under action of a generated alternating magnetic field. Before application to vehicle driving, such small and medium-sized fuel generator sets are used as a movable temporary power supply system which is characterized by a relatively stable working state, a smaller rotation speed fluctuation and infrequent start and stop. However, the auxiliary power unit used in the series hybrid vehicle is connected in parallel with the power battery in circuitry and drives the vehicle to run through the motor, which requires the fuel generator set to have characteristics such as large scope of coverage of operating conditions, quick response and smooth transition. The control level of the fuel generator set directly affects power performance, safety and service life of the whole power system. That is to say, the fuel generator set conventionally used as the movable temporary power supply system and the fuel generator set in the series hybrid vehicle have completely different performance requirements, and therefore are different in terms of structural design, system connection and control policy, so that technically they cannot be obviously substituted.

Taking into account both emission and fuel consumption, the auxiliary power unit of the series hybrid vehicle currently has the following two basic working modes: the first is a single-point constant-power working mode (also called a switching mode), and the second is a working mode along a minimum fuel consumption curve.

The auxiliary power unit employing the single-point constant-power working mode only has two states: stably working at a certain working condition point with very low fuel consumption and emission, and a dynamic load of the vehicle is completely balanced by the power battery. In this way, although the emission and fuel consumption of the auxiliary power unit are very low, the power battery may be seriously harmed.

The auxiliary power unit employing the working mode along a minimum fuel consumption curve can track the changes of an actual vehicle load, and effectively reduce requirements of the vehicle for power battery output capacity and power; the power battery may cyclically work with less power, which facilitates prolonging of the service life of the power battery and selection of a power battery with less power. However, the auxiliary power unit must respond quickly to vehicle power requirements, so it will affect efficiency of the engine and emission properties. Furthermore, it is relatively difficult to accurately predict the power needs in a future travel phase of the vehicle.

Additionally, due to limitations of factors such as the number of engine cylinders, cylinder bore and piston stroke, a single engine is limited with respect to power and torque and impossible to expand infinitely, and sometimes cannot meet higher requirements of some vehicles for power and torque. How to meet higher requirements of some vehicles for power and torque is one of the top issues in the vehicle industry.

SUMMARY OF THE INVENTION

An embodiment of the disclosure provides a novel power system of a series hybrid vehicle, which permits the use of alternative fuels with a lower energy density in place of conventional gasoline or diesel and permits a fuel generator set to always work in a working condition region with very low oil consumption and emission, to reduce emission, improve fuel economy and effectively remedy a relatively low energy conversion efficiency of the power system of the series hybrid vehicle.

Another embodiment of the present disclosure is to conveniently and reliably use the power of multiple engines in combination to solve the problem of limited power and torque provided by a single engine.

In particular the present disclosure provides a power system of a series hybrid vehicle, which may comprise a fuel source; a control system; at least two auxiliary power units, wherein each of the auxiliary power units may, under control of the control system, independently receive fuel from the fuel source and convert chemical energy in the fuel into electrical energy and output the electrical energy to a common current bus; a power battery electrically connected to a common current bus to, under control of the control system, receive electrical energy from the common current bus to perform charging, or perform discharging through the common current bus; and a traction motor electrically connected to the common current bus to receive electrical energy from the common current bus under control of the control system, and convert the electrical energy into mechanical energy and transmit the mechanical energy to a power train of the vehicle so as to drive the vehicle to run.

Furthermore, the fuel supplied by the fuel source may be one of liquefied natural gas, compressed natural gas, synthetic oil, methanol, ethanol, esterified vegetable oil or dimethyl ether, or a combination thereof. In one embodiment, the fuel is liquefied natural gas. Moreover, the number of the auxiliary power units may be at least 3, or 6.

Furthermore, each auxiliary power unit may comprise: an engine, which may, under control of the control system, receive fuel from the fuel source and convert the chemical energy in the fuel into mechanical energy; and a generator, which may, under control of the control system, receive the mechanical energy from the engine of the corresponding auxiliary power unit and convert the mechanical energy into alternating current (AC) or direct current (DC) electrical energy.

Furthermore, the power system may further comprise an AC grid-connection device which may convert the corresponding AC electrical energy outputted by the respective auxiliary power unit into corresponding alternating currents at the same voltage, the same frequency and the same phase with each other and output them to the common current bus. Alternatively, each auxiliary power unit may comprise a rectifier which may receive AC electrical energy from the generator of the corresponding auxiliary power unit and convert the AC electrical energy into direct current and output the direct current to the common current bus.

Furthermore, each auxiliary power unit may further comprise a branch current voltage sensor which may be configured to detect branch current voltage information of the generator in the corresponding auxiliary power unit, and transmit the detected branch current voltage information to the control system. Furthermore, the power system of the series hybrid vehicle may further comprise a bus current voltage sensor which may be configured to detect bus current voltage information on the common current bus and transmit the detected bus current voltage information to the control system.

Furthermore, each auxiliary power unit may further comprise: a clutch, which may be arranged in a transmission path of mechanical energy from the engine to the generator, so that the transmission path of mechanical energy from the engine to the generator may be connected or disconnected under control of the control system. Moreover, in some examples, the clutch may be electrically controllable.

Furthermore, each auxiliary power unit may further comprise a position sensor which is configured to detect position information of the clutch in the corresponding auxiliary power unit and transmit the position information to the control system.

Furthermore, the control system may comprise a power controller which may be configured to control the operations of the engine, the clutch and the generator in each auxiliary power unit and the operations of the power battery and the traction motor in the power system of the series hybrid vehicle according to the branch current voltage information detected by each branch current voltage sensor, the bus current voltage information detected by the bus current voltage sensor, battery status information from a battery management system carried by the power battery itself and vehicle speed torque information detected by a vehicle speed torque sensor of the series hybrid vehicle, and based on a predetermined control policy.

Furthermore, the control system may further comprise a power amplifying circuit configured to amplify the power of a pulse width modulation signal outputted by the power controller to control the clutch and to output the pulse width modulation signal with an amplified power. Furthermore, each auxiliary power unit may further comprise a gas valve and a cylinder. The gas valve may be connected to a high pressure gas circuit in the power system of the series hybrid vehicle and controlled by the pulse width modulation signal outputted by the power amplifying circuit so that when the gas valve turns on the high pressure gas circuit, the high pressure gas from the high pressure gas circuit may drive the cylinder to switch the clutch to a disengaged state to disconnect the transmission path of mechanical energy from the engine to the generator; when the gas valve cuts off the high pressure gas circuit, the high pressure gas driving the cylinder is excluded so that the clutch may be restored to an engaged state to connect the transmission path of mechanical energy from the engine to the generator.

Furthermore, each generator may be an AC synchronous generator; and the control system may further comprise an excitation circuit which may be configured to amplify power of a pulse width modulation signal outputted by the power controller to control the generator and output the pulse width modulation signal with an amplified power to an exciter of the generator.

Furthermore, the rectifier may comprise an uncontrollable rectifying bridge device. The power battery may be a battery pack that includes a group of battery cells connected in series, which permits discharge or charge of AC or DC electrical energy, and transmits the battery status information to the control system via the battery management system carried by the battery pack. The traction motor may be an AC asynchronous motor which carries an inverter and a motor controller in itself.

Utilizing two or more independently controllable auxiliary power units, the power system of the series hybrid vehicle substantially reduces the power requirement for each auxiliary power unit so that the power system according to the present disclosure is adapted to permit the use of alternative fuels with a lower energy density in place of conventional gasoline or diesel and permit the engine in the auxiliary power unit to work in a working condition region with very low oil consumption and emission, effectively reduce emission, improve fuel economy and remedy a relatively low energy conversion efficiency of the power system of the series hybrid vehicle.

Besides, an appropriate number of engines as needed may be flexibly set for combined use by the power system of the series hybrid vehicle provided by the present disclosure. This conveniently and reliably solves the problem that a single engine has limited engine power and torque so that it is difficult to meet requirements for higher power and torque of some vehicles.

BRIEF DESCRIPTION OF THE DRAWINGS

Some embodiments of the present disclosure will be described in detail hereafter with reference to the drawings by way of example, but not limitation. Like reference numbers throughout the drawings refer to the like or similar parts or portions. In the drawings.

DETAILED DESCRIPTION OF THE INVENTION

Figure 1:
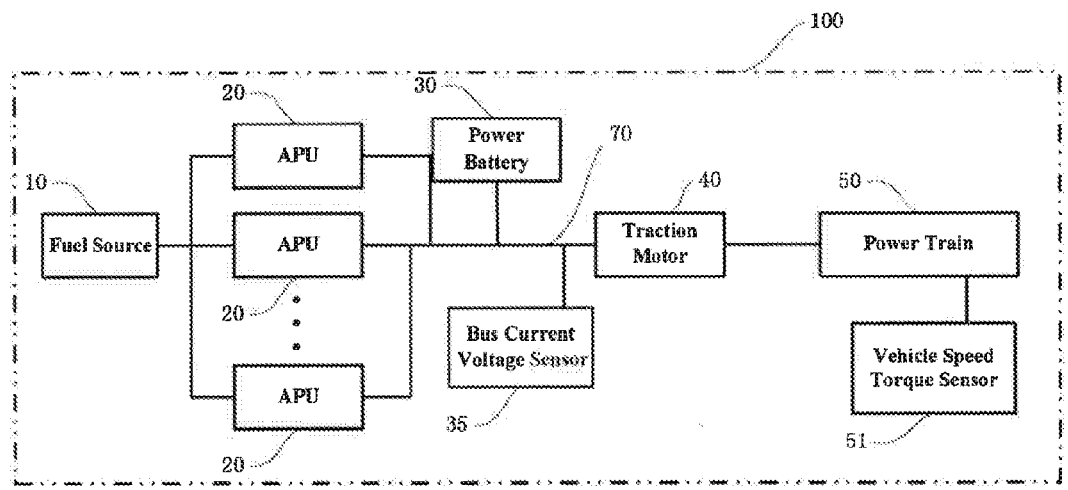
FIG. 1 is a schematic diagram illustrating a power system of a series hybrid vehicle according to an embodiment of the present disclosure, wherein the control system is not shown for the sake of clarity.
Figure 2:
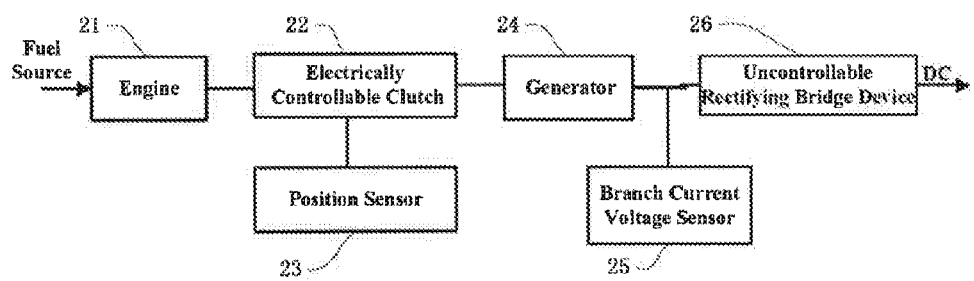
FIG. 2 is a schematic diagram illustrating an auxiliary power unit of a power system of a series hybrid vehicle according to an embodiment of the present disclosure.
Figure 3:
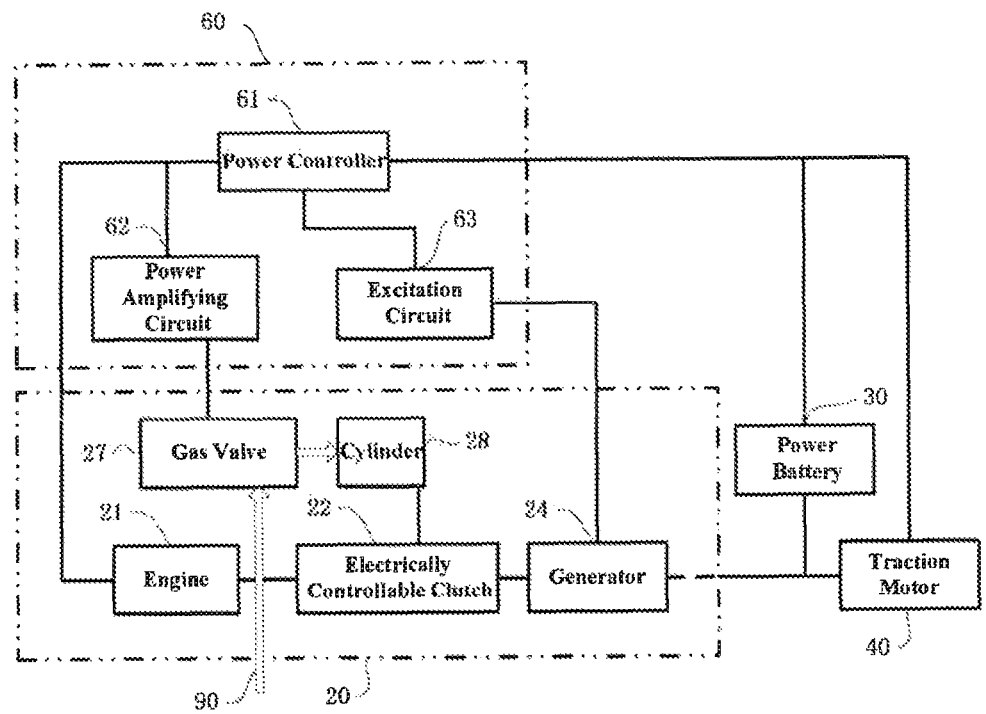
FIG. 3 is a schematic diagram illustrating a power system of a series hybrid vehicle according to an embodiment of the present disclosure, showing connectional relationship between main parts of the control system and power system, and for the sake of clarity not showing sensors and connection thereof to the control system.

As shown in FIGS. 1-3, the power system of a series hybrid vehicle 100 according to an embodiment of the present disclosure generally may comprise a fuel source 10; a control system 60; a power battery 30, which is electrically connected to a common current bus 70 to, under control of the control system 60, receive electrical energy from the common current bus 70 to perform charging, or perform discharging through the common current bus 70; and a traction motor 40, which is electrically connected to the common current bus 70 to, under control of the control system 60, receive electrical energy from the common current bus 70 and convert it into mechanical energy and transfer the mechanical energy to a power train 50 of the vehicle 100 so as to drive the vehicle to run.

At least two auxiliary power units 20 may be provided in the power system of the series hybrid vehicle 100 according to the present disclosure, and under control of the control system 60, each of the auxiliary power units 20 independently receives fuel from the fuel source 10 and converts chemical energy in the fuel into electrical energy and outputs it to the common current bus 70. The number of the auxiliary power units 20 may be set to be at least 2, at least 3, or more or, for example, 6 or 8. For simplifying the control process, each auxiliary power unit 20 may be identical in terms of structure and performance characteristics. A rated power outputted by each auxiliary power unit 20 may be selected according to the need for power of the whole vehicle and the number of the auxiliary power units, generally 10-30 kw, or for example 20 kw. In some embodiments, the auxiliary power units 20 may be different from each other in terms of structure and/or performance characteristics.

In an embodiment of the present disclosure, the fuel supplied by the fuel source 10 may be liquefied natural gas, compressed natural gas, synthetic oil, methanol, ethanol, esterified vegetable oil or dimethyl ether, or a combination thereof. Prior to the present disclosure, such alternative fuels have lower energy density, and thus the engine using such fuels usually has a relatively narrower optimal working condition power section and could not duly respond quickly following the power requirement of the vehicle, therefore those skilled in the art usually believe that such alternative fuels are not suitable for use in series hybrid vehicles.

However, in the present invention, which employs a power system having at least two independently controllable auxiliary power units 20, a rated power of each auxiliary power unit 20 is much smaller than that of the single auxiliary power unit in the conventional series hybrid vehicles. Assume that the number of the auxiliary power units 20 in the present invention is n (n is a positive integer greater than or equal to 2), the rated power of each auxiliary power unit 20 in the present invention may roughly be 1/n of the rated power of the single auxiliary power unit of the conventional series hybrid vehicles having the same demand for power. As such, during travel of the vehicle, by independently starting and/or stopping a certain or certain number of auxiliary power units 20, the engine of each auxiliary power unit 20 is enabled as much as possible to work in an optimal working condition power section, to meet the power requirement of the vehicle, and effectively remedy the problem of lower energy density of the alternative fuels by reducing fuel consumption of per unit mileage.

Besides, because of having at least two independently controllable auxiliary power units 20, the present invention also additionally and unexpectedly substantially improves the reliability of operation of the power system of the series hybrid vehicles, and effectively solves the problem that a conventional series hybrid vehicle can only completely rely on the power battery to travel a very short distance upon malfunction of the single engine or generator, which is very favorable for freight vehicles for long-distance transportation. In the present invention, when the engine or generator in one auxiliary power unit 20 malfunctions, other auxiliary power units 20 will not be caused to stop, the control system 60 may start a normal auxiliary power unit 20 to work according to a predetermined control policy and stop the operation of the malfunctioning auxiliary power unit 20. Certainly, at this time the control system 60 usually notifies the driver of servicing in time with a signal in a suitable form (e.g., turning on a fault indicator lamp).

In particular, in some embodiments of the present disclosure, the single-point constant-power working mode and the working mode along a minimum fuel consumption curve of the auxiliary power unit in the conventional series hybrid vehicles may be combined to control the power system of the present disclosure. Specifically, the engine of each started auxiliary power unit 20 may be arranged to work in an optimal working condition power section and based on a power following control strategy to meet the load demand of the whole vehicle in this section. For example, in some embodiments of the present disclosure, the optimal working condition power section of each auxiliary power unit 20 may be set between +10% and −20% above and below the optimal working condition point thereof, or between +5% and −10% above and below the optimal working condition point thereof.

Furthermore, each auxiliary power unit 20 may comprise: an engine 21 configured to receive fuel from the fuel source 10 under control of the control system 60 and convert the chemical energy in the fuel into mechanical energy; and a generator 24 configured to receive mechanical energy from the engine 21 of the corresponding auxiliary power unit 20 under control of the control system 60 and convert it into alternating current electrical energy (e.g., three-phase AC power). Although an AC generator has a simpler structure than a DC generator, in some embodiments, the generator 24 may be a DC generator that may convert the mechanical energy from engine 21 into DC electrical energy for simplifying the subsequent control process. In an embodiment that will be described below, instead of providing a DC generator, an additional rectifier, for example, an uncontrollable rectifying bridge device 26, may be provided for each AC generator 24 in order to convert the AC electrical energy from the AC generator 24 into DC. The power of the engine 21 may be selected according to the power demand of the corresponding auxiliary power unit 20. For example, the energy conversion efficiency of the auxiliary power unit 20 may be about 80-88%. If a rated output power of the auxiliary power unit 20 is 18 kw, a suitable engine may be selected from engines with a rated output power of about 21-23 kw. Such selection of an engine to match the power can be very easily implemented by those skilled in the art according to specific needs and will not be described in detail here.

Figure 4:
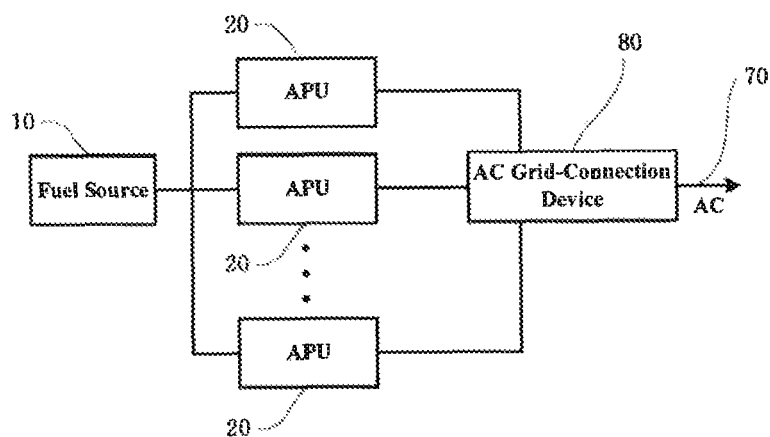
FIG. 4 is a schematic diagram illustrating a portion of the power system of FIG. 1 but an AC grid-connection device is further provided.

In order to connect the AC electrical energy outputted by each auxiliary power unit 20 in parallel into the common current bus 70, in an embodiment as shown in FIG. 4, the power system of the series hybrid vehicle of the present disclosure may comprise an AC grid-connection device 80 which may convert the corresponding AC electrical energy outputted by the respective auxiliary power units 20 into corresponding alternating current at the same voltage, the same frequency and the same phase with each other and output them to the common current bus 70. However, in an embodiment as shown in FIG. 2, each auxiliary power unit 20 may be arranged to include the rectifier 26 as described above, which may receive the alternating electrical energy from the generator 24 of the corresponding auxiliary power unit 20 and convert it into direct current and output the direct current to the common current bus 70. In the case that the generator 24 is a DC generator, the rectifier 26 may be omitted.

Each auxiliary power unit 20 may further comprise a branch current voltage sensor 25 which is configured to detect branch current voltage information of the generator 24 in the corresponding auxiliary power unit 20, and transmit the detected branch current voltage information to the control system 60. Furthermore, the power system of the series hybrid vehicle may further comprise a bus current voltage sensor 35 which is configured to detect bus current voltage information on the common current bus 70 and transmit the detected bus current voltage information to the control system 60.

In some embodiments, each auxiliary power unit 20 may further comprise a clutch 22 which is arranged in a transmission path of mechanical energy from the engine 21 to the generator 24, so that the mechanical energy transmission path from the engine 21 to the generator 24 can be smoothly connected or disconnected under control of the control system 60. This may effectively solve large impact issues upon start of the engine and reliably and efficiently control frequent start and stop of the engine. In such embodiments, each auxiliary power unit 20 may further comprise a position sensor 23 which is configured to detect position information of the clutch 22 in the corresponding auxiliary power unit 20 and transmit the position information to the control system 60 to achieve closed loop control of the clutch 22. For being controlled automatically by the control system 60, in some embodiments, the clutch 22 may be electrically controllable, and can be actuated pneumatically or hydraulically as described below.

As shown in FIG. 3, the control system 60 may comprise a power controller 61. For the sake of clarity, the sensors and the connection relationship thereof to the control system are not shown in FIG. 3. However, those skilled in the art can appreciate according to the technical solution of the present disclosure that the sensors (including a position sensor 23, all branch current voltage sensors 25, a bus current voltage sensor 35 and a vehicle speed torque sensor 51) not shown in FIG. 3 may all be arranged to be electrically connected to the power controller 61 of the control system 60. According to the branch current voltage information detected by each branch current voltage sensor 25, the bus current voltage information detected by the bus current voltage sensor 35, the battery status information from a battery management system (not shown) carried by the power battery 30 itself and vehicle speed torque information detected by the vehicle speed torque sensor 51 of the series hybrid vehicle, and based on the predetermined control policy, the power controller 61 may be configured to control the operations of the engine, the clutch 22 and the generator in each auxiliary power unit 20 and the operations of the power battery 30 and the traction motor 40 in the power system of the series hybrid vehicle. The power controller 61 may be implemented by a vehicle control unit (VCU) of the series hybrid vehicle.

The control system 60 may further comprise a power amplifying circuit 62 configured to amplify the power of a pulse width modulation signal outputted by the power controller 61 to control the electrically controllable clutch 22 and to output the pulse width modulation signal with an amplified power. To achieve actuation of the electrically controllable clutch 22, each auxiliary power unit 22 may further comprise a gas valve 27 and a cylinder 28. The gas valve 27 is connected to a high-pressure gas circuit 90 in the power system of the series hybrid vehicle, and controlled by the pulse width modulation signal outputted by the power amplifying circuit 62, so that when the gas valve 27 turns on the gas circuit 90, the high pressure gas drives the cylinder to switch the electrically controllable clutch 22 to a disengaged state to disconnect the transmission path of mechanical energy from the engine 21 to the generator 24; when the gas valve 27 cuts off the gas circuit 90, the high-pressure gas driving the cylinder is excluded so that the electrically controllable clutch 22 restores to an engaged state to connect the transmission path of mechanical energy from the engine 21 to the generator 24. According to the above description, those skilled in the art should recognize that in some alternative embodiments of the present disclosure, it is feasible to use an oil valve and an oil cylinder connected to a high-pressure oil circuit to achieve actuation of the electrically controllable clutch 22. Moreover, in some embodiments, the clutch 22 may be actuated in other suitable manners, for example, by means of a solenoid actuator.

In addition, it would be explained that, in some embodiments, the electrically controllable clutch 22 (and the corresponding gas valve 27, cylinder 28 and the power amplifying circuit 62) is not requisite. At this time, an output shaft of the engine 21 may be directly connected to an input shaft of the generator 24 via for example, a spline.

In some embodiments of the present disclosure, each generator 24 may be an AC synchronous generator (e.g., a three-phase AC synchronous generator). At this time, the control system 60 may further comprise an excitation circuit 63, which is configured to perform power amplification to the pulse width modulation signal outputted by the power controller 61 to control the generator 24 and output the pulse width modulation signal with an amplified power to an exciter of the generator 24. In particular, as described above, the rectifier 26 may be an uncontrollable rectifying bridge device. Although other suitable rectifier may be applied here, the uncontrollable rectifying bridge device 26 has a higher rectifying efficiency, which is very advantageous in the power system of the present disclosure and may, to a certain degree, remedy the energy conversion efficiency of the series hybrid system.

The power battery 30 may be a battery pack that includes a group of battery cells connected in series, which permits discharge or charge of AC or DC electrical energy, and transmits the battery status information to the control system 60 via the battery management system carried by the battery pack itself. The traction motor 40 may be an AC asynchronous motor (e.g., a three-phase AC asynchronous motor) which carries an inverter and a motor controller in itself. In some embodiments, other suitable motors could be used as the traction motor 40 based on, for example, the form of the current in the common current bus 70 and the requirements of driving the vehicle.

When the electrical energy outputted by the auxiliary power unit 20 to the common current bus 70 is an alternating current, in order to achieve the charge and discharge of the power battery 30, a grid-connected inverter and a rectifier should be included in the power battery 30 itself or provided between the power battery 30 and the common current bus 70, wherein the grid-connected inverter, under control of the control system 60, converts the direct current directly outputted by the battery pack into suitable alternating current to achieve AC grid connection; under control of the control system 60, the rectifier converts the AC electrical energy from the common current bus 70 into direct current to charge the battery pack. The grid-connected inverter or the rectifier described here for the power battery 30 are well known by those skilled in the art and will not be unnecessarily described in detail herein.

According to an embodiment, the engine of each started auxiliary power unit 20 may be arranged to work in an optimal working condition power section and based a power following control strategy to meet the load demand of the whole vehicle in this section, and each auxiliary power unit 20 is simply enabled to work at the optimal working condition point. Therefore, this effectively reduces requirements of the vehicle travel for power battery output capacity and power; the power battery may cyclically work with a smaller power, which facilitates prolonging of the service life of the power battery and selection of a power battery with a smaller power.

Those skilled in the art can appreciate that although exemplary embodiments have been illustrated and described in detail, many other variations or modifications conforming to the principles of the present disclosure can be directly determined or derived from the disclosure of the present disclosure without departing from the spirit and scope of the present disclosure. Therefore, the scope of the present disclosure shall be understood and recognized as covering all of these other variations or modifications.

What is claimed is:

1. A power system of a series hybrid vehicle, comprising:
   a fuel source;
   a control system;
   at least two auxiliary power units, wherein each of the auxiliary power units, under control of the control system, independently receives fuel from the fuel source, and converts chemical energy in the fuel into electrical energy and outputs the electrical energy to a common current bus, wherein each of the auxiliary power units comprises:
   an engine, which, under control of the control system, receives fuel from the fuel source and converts the chemical energy in the fuel into mechanical energy; and
   a generator, which, under control of the control system, receives mechanical energy from the engine of a corresponding auxiliary power unit and converts the mechanical energy into AC or DC electrical energy;
   a power battery electrically connected to the common current bus to, under control of the control system, receive electrical energy from the common current bus to perform charging, or perform discharging through the common current bus;
   a traction motor electrically connected to the common current bus to, under control of the control system, receive electrical energy from the common current bus, and convert it into mechanical energy and transmit the mechanical energy to a power train of the vehicle so as to drive the vehicle to run; and
   an AC grid-connection device, which converts the corresponding AC electrical energy outputted by the respective auxiliary power units into corresponding alternating currents at the same voltage, the same frequency and the same phase with each other and outputs them to the common current bus.

2. The power system of a series hybrid vehicle according to claim 1, wherein
   the fuel supplied by the fuel source is liquefied natural gas, compressed natural gas, synthetic oil, methanol, ethanol, esterified vegetable oil or dimethyl ether, or a combination thereof; and
   the number of the auxiliary power units is at least 3.

3. The power system of a series hybrid vehicle according to claim 2, wherein the fuel supplied by the fuel source is liquefied natural gas.

4. The power system of a series hybrid vehicle according to claim 2, wherein the number of the auxiliary power units is 6.

5. The power system of a series hybrid vehicle according to claim 2, wherein the clutch is electrically controllable.

6. The power system of a series hybrid vehicle according to claim 1, wherein
   each of the auxiliary power units comprises a rectifier which receives AC electrical energy from the generator of the corresponding auxiliary power unit and converts the AC electrical energy into direct current and outputs the direct current to the common current bus.

7. The power system of a series hybrid vehicle according to claim 6, wherein
the power battery is a battery pack and includes a group of battery cells connected in series, which battery pack permits discharge or charge of AC or DC electrical energy, and transmits the battery status information to the control system; and
the traction motor is an AC asynchronous motor which carries an inverter and a motor controller.

8. The power system of a series hybrid vehicle according to claim 7, wherein the rectifier comprises an uncontrollable rectifying bridge device.

9. The power system of a series hybrid vehicle according to claim 1, wherein
each of the auxiliary power units further comprises:
a branch current voltage sensor, which is configured to detect branch current voltage information of the generator in the corresponding auxiliary power unit, and to transmit the branch current voltage information to the control system; and
the power system of the series hybrid vehicle further comprises:
a bus current voltage sensor, which is configured to detect bus current voltage information on the common current bus and to transmit detected bus current voltage information to the control system.

10. The power system of a series hybrid vehicle according to claim 1, wherein each of the auxiliary power units further comprises:
a clutch, which is arranged in a transmission path of mechanical energy from the engine to the generator, so that the transmission path of mechanical energy from the engine to the generator is connected or disconnected under control of the control system.

11. The power system of a series hybrid vehicle according to claim 10, wherein
each of the auxiliary power units further comprises:
a position sensor, which is configured to detect position information of the clutch in the corresponding auxiliary power unit and to transmit the position information to the control system.

12. The power system of a series hybrid vehicle according to claim 11, wherein
the control system comprises a power controller which is configured to control the operations of the engine, the clutch and the generator in each auxiliary power unit and the operations of the power battery and the traction motor in the power system of the series hybrid vehicle according to the branch current voltage information detected by each branch current voltage sensor, the bus current voltage information detected by the bus current voltage sensor, battery status information of the power battery and vehicle speed torque information detected by a vehicle speed torque sensor of the series hybrid vehicle, and based on a predetermined control policy.

13. The power system of a series hybrid vehicle according to claim 12, wherein
the control system further comprises a power amplifying circuit, which amplifies power of a pulse width modulation signal outputted by the power controller to control the clutch, and outputs the pulse width modulation signal with an amplified power; and
each of the auxiliary power units further comprises a gas valve and a cylinder, the gas valve being connected to a high pressure gas circuit in the power system of the series hybrid vehicle, and controlled by the pulse width modulation signal outputted by the power amplifying circuit, so that
when the gas valve turns on the high pressure gas circuit, high pressure gas from the high pressure gas circuit drives the cylinder to switch the clutch to a disengaged state to disconnect the transmission path of mechanical energy from the engine to the generator;
when the gas valve disconnects the high pressure gas circuit, the high pressure gas driving the cylinder is excluded so that the clutch is restored to an engaged state to connect the transmission path of mechanical energy from the engine to the generator.

14. The power system of a series hybrid vehicle according to claim 12, wherein
each generator is an AC synchronous generator; and
the control system further comprises an excitation circuit, which amplifies power of a pulse width modulation signal outputted by the power controller to control the generators, and outputs the pulse width modulation signal with an amplified power to an exciter of the generator.

15. A power system of a series hybrid vehicle, comprising:
a fuel source;
a control system;
at least two auxiliary power units, wherein each of the auxiliary power units, under control of the control system, independently receives fuel from the fuel source, and converts chemical energy in the fuel into electrical energy and outputs the electrical energy to a common current bus, wherein
each of the auxiliary power units comprises a rectifier which receives AC electrical energy from a generator of the corresponding auxiliary power unit and converts the AC electrical energy into direct current and outputs the direct current to the common current bus;
a power battery electrically connected to the common current bus to, under control of the control system, receive electrical energy from the common current bus to perform charging, or perform discharging through the common current bus; and
a traction motor electrically connected to the common current bus to, under control of the control system, receive electrical energy from the common current bus, and convert it into mechanical energy and transmit the mechanical energy to a power train of the vehicle so as to drive the vehicle to run.

16. The power system of a series hybrid vehicle according to claim 15, wherein the power battery is a battery pack and includes a group of battery cells connected in series, which battery pack permits discharge or charge of AC or DC electrical energy, and transmits the battery status information to the control system; and
the traction motor is an AC asynchronous motor which carries an inverter and a motor controller.

17. The power system of a series hybrid vehicle according to claim 16, wherein the rectifier comprises an uncontrollable rectifying bridge device.

18. A power system of a series hybrid vehicle, comprising:
a fuel source, wherein fuel supplied by the fuel source is liquefied natural gas;
a control system;
at least three auxiliary power units, wherein each of the auxiliary power units, under control of the control system, independently receives fuel from the fuel source, and converts chemical energy in the fuel into electrical energy and outputs the electrical energy to a common current bus;

a power battery electrically connected to the common current bus to, under control of the control system, receive electrical energy from the common current bus to perform charging, or perform discharging through the common current bus; and a traction motor electrically connected to the common current bus to, under control of the control system, receive electrical energy from the common current bus, and convert it into mechanical energy and transmit the mechanical energy to a power train of the vehicle so as to drive the vehicle to run.

19. The power system of a series hybrid vehicle according to claim 18, wherein the number of the auxiliary power units is 6.

20. The power system of a series hybrid vehicle according to claim 18, wherein the clutch is electrically controllable.

* * * * *